United States Patent Office 3,814,582
Patented June 4, 1974

3,814,582
AUTOMATED CHEMICAL ANALYSER SYSTEM
Donald G. Rohrbaugh, Santa Ana, Everett James Petersen, Jr., Glendora, Charles Peter Chase, Brea, and William Robert Pearson, Placentia, Calif., assignors to Beckman Instruments, Inc.
Filed Mar. 2, 1972, Ser. No. 231,351
Int. Cl. G01n 1/14, 1/18
U.S. Cl. 23—230 R                4 Claims

ABSTRACT OF THE DISCLOSURE

A modular chemical analyser system provides for the analysis of a wide range of chemical products in diverse serialized repetitive automated processes. Typically, a solid tablet sample is placed in a sample reactor module and this module is paired with an analysis tube module, both positioned in specific apertures of a chemical analysis rotary module. A chemical analysis sample dissolver module typically cooperatively provides a scheduled solvent volume, disrupts, stirs and dissolves the sample in the solvent, and makes a filtered solution available in the reactor module. Each reactor module accommodates an individual sample solution in the sequential processing on the rotary module. A multiplicity of cooperative liquid volume probe means are concentrically disposed on a central reciprocating elevator means. They provide, in conjunction with a multiplicity of chemical solution pump means, programmed individual volumes of individual chemical solutions suitable for chemically processing the sample solution in a serialized specific pair of reactor module and tube module. The system finally yields an aliquot analysis solution sample suitable for a direct quantitative chemical analysis measurement, as by a spectrophotometer or the like.

CROSS-REFERENCES TO RELATED APPLICATIONS

This application is related to the following applications, all assigned to the same assignee as the present application:

U.S. Patent Application Serial No. 177,555, for Tablet Disruptor Device, by Donald G. Rohrbaugh and Everett J. Petersen, Jr., filed Sept. 3, 1971; now U.S. Pat. No. 3,724,765, and the following applications filed herewith:

U.S. Patent Application Serial No. 231,348, for Chemical Sample Reactor Module by Donald G. Rohrbaugh filed Mar. 2, 1972;

U.S. Patent Application Serial No 231,350, for Chemical Analysis Tube Module by Donald G. Rohrbaugh filed Mar. 2, 1972;

U.S. Patent Application Serial No. 231,268, for Chemical Analysis Sample Dissolver Module, by Donald G. Rohrbaugh, Everett Petersen, Jr., and C. P. Chase filed Mar. 2, 1972; and U.S. Patent Application Serial No. 231,353 for Chemical Analysis Rotary Module by Donald G. Rohrbaugh and William R. Pearson filed Mar. 2, 1972.

BACKGROUND OF THE INVENTION

Tamm, in U.S. Pat. 3,615,236, discloses an automatic chemical analysis apparatus including a turntable carrying a circumferentially arranged multiplicity of single reaction vessels into each of which is placed a sample. Peripheral sample treating means are located exteriorly of the turntable. The sample treating means includes means for adding reagents, removing all or part of the sample, stirring means and the like. The sample treating means are all disposed on peripherally exteriorly secured mounting plates.

Unger, in U.S. Pat. 3,533,744, discloses an apparatus for automatically analyzing blood or other liquid samples. Fractions of each sample are dispensed into separate receptacles in a sample carrier and then transferred on a linear conveyor to a reagent addition station in which reagents are added to the sample fractions. The fractions are transported then to a reading station where the results of the reactions on all of the samples are simultaneously determined and recorded, without removing the sample fractions from their receptacles.

Baruch, in U.S. Pat. 3,193,358, provides an automated analytical apparatus suitable for handling and treating liquid samples in accordance with standard analytical procedures. The apparatus advances liquid samples in a row along a predetermined linear path in intermittent stop-and-go mode. Each sample stays at such a station for a predetermined length of time and moves on to the next station, with the entire cycle being precisely controlled as to duration by a master timer unit. The system is particularly suitable for analysis of blood samples.

Skeggs, in U.S. Pat. 2,879,141, discloses an automatic apparatus for treating various liquids for analysis. The apparatus incorporates a device for automatically feeding a plurality of different samples to the turntable.

The autimated chemical analyser system of this invention provides modules which can be combined to perform composition uniformity testing of chemical samples such as pharmaceutical tablets, capsules, powders or liquid products. The system can be utilized to perform a wide range of automated liquid phase analytical chemical analysis procedures on serialized individual chemical samples. Specifically, the automated chemical analyzer system taught herein embodies the cross-referenced applications disclosed herein above. It is feasible to provide a specific chemical analytical procedure cooperatively utilizing those modules and portions of modules which may be required for the specific chemical procedure.

SUMMARY OF THE INVENTION

A modular automated chemical analyser system provides for the chemical analysis of a wide range of chemical products, including pharmaceutical tablets, capsules, powders, and liquid samples. The system provides automated individual sample chemical analysis utilizing standard wet chemical analysis procedures for each individual chemical sample. A single sample tablet is placed in a single sample reactor module and this module is paired with an analysis tube module, both positioned in specific apertures of a chemical analysis rotary module. A multiplicity of pairs of chemical sample reactor modules and chemical analysis tube modules are radially operatively serially positioned in the specific aperture of the support table disc, the chemical analysis rotary module providing the rotating support table disc. The rotary module also has a multiplicity of operative liquid volume probe means concentrically disposed on a central reciprocating elevator means. A multiplicity of chemical solution pump means, cooperatively with the multiplicity of operative liquid volume probe means, provide on signal for programmed individual volumes of individual chemical solutions required in each one of the reactor modules, tube modules, and finally in the quantitative analysis instrument on signal. A chemical analysis sample dissolver module is operatively positioned adjacent to the analysis rotary module, serially providing a scheduled solvent volume for each one of the chemical sample reactor modules disposed in the support table disc. A tablet disruptor device, having a drive means provided by the sample dissolver module, provides rotation of the disruptor device in each one of the sample reactor modules on signal, the device disrupting and dissolving the chemical sample in the solvent volume. Alternatively, a liquid volume probe means can serially provide a scheduled solvent volume to each one of the reactor modules on signal. The multiplicity of solution pump means, together with the liquid volume probe means, can provide for a solvent volume for each individual chemical sample, for transferring a precise volume of a sample solution from the reactor module to a container of the tube module and for mixing a precise volume of at least one reagent solution with a precise volume of the sample solution disposed in the tube module, providing a precise chemical analysis reacted solution as the end result of the analytical procedure. The reacted solution is pumped into a quantitative analysis instrument for provision of an analysis value. After the analysis value is measured and recorded, the reacted solution is then pumped into a waste disposal unit.

Other aspects and advantages of this invention are taught in the following description and claims.

BRIEF DESCRIPTION OF THE DRAWINGS

The description of this invention is to be read in conjunction with the following drawings.

DESCRIPTION OF THE PREFERRED EMBODIMENT

Figure 1:
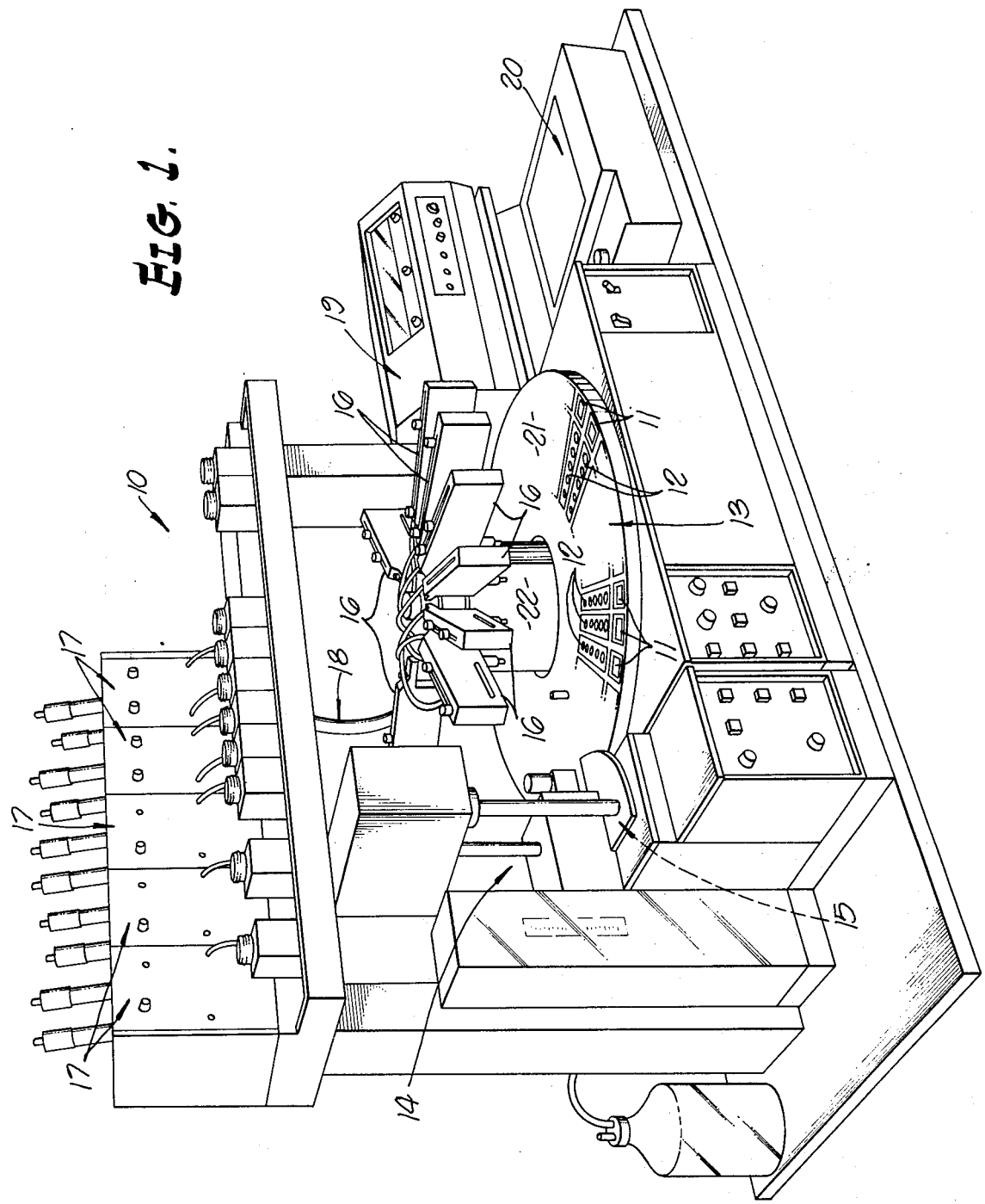
FIG. 1 is a perspective elevation view of the automated chemical analyser system.

Referring to FIG. 1 in detail the automated chemical analyser system is shown, together with auxiliary apparatus. In the automated chemical analyser system 10 each sample reactor module 11 is paired with an analysis tube module 12. A multiplicity of pairs of reactor module 11 and tube module 12 are disposed in serialized array on the support table disc 21, which is a component of the chemical analysis rotary module 13. A chemical analysis sample dissolver module 14 is operatively positioned to the left of the analysis rotary module 13, the dissolver module 14 having a tablet disruptor device 15 operatively secured to module 14. Multiple liquid volume probe means 16 of the chemical analysis rotary module 13 are shown positioned at the required intervals around the module 13. Multiple chemical solution pump means 17 are shown disposed above the analysis rotary module 13, the multiple solution pump means 17 being conductively connected to the multiple liquid volume probe means 16 by the solution conducting tubing harness 18. The conducting tubing harness 18 comprises the required number of individual conducting tubings from the multiple pump means 17 to the liquid volume probe means 16 which are required for a specific chemical analytical procedure. A quantitative analytical measurement instrument 19 such as a spectrophotometer, colorometer, fluorometer, or the like can be utilized. A strip recorder 20 records the quantitative analysis information measured by the instrument 19. Other recording devices such as teletype, digital recorders or the like can be utilized. The automated chemical analyser system 10 specifically comprises the sample reactor module 11, the analysis tube module 12, the chemical analysis rotary module 13, the sample dissolver module 14, and the tablet disruptor device 15. The above listed cooperative components of the chemical analyser system 10 are specifically taught in the cross-referenced related applications disclosed above, and are incorporated herein by reference. All of the above listed components of the analyser system 10 need not be utilized in every chemical procedure. Dependent upon the required analysis procedure, some components of the analyser system 10 can be omitted from use without diminishing the cooperative interaction of the remainder of the system components.

The cooperative interaction of the modular chemical analyser system 10 components are briefly summarized below, omitting the detailed teachings described in the cross-referenced related applications. A single chemical sample is placed in each one of a chemical sample reactor module 11. Each one of a multiplicity of chemical sample reactor modules 11 is paired with a chemical analysis tube module 12. The multiplicity of paired modules 11 and 12 are serially positioned in a support table disc 21 of the chemical analysis rotary module 13, the sample reactor module 11 being disposed outermost on the perimeter of table disc 21. A multiplicity of operative liquid volume probe means 16 are concentrically disposed on a central reciprocating elevator means 22, as components of the rotary module 13. The multiplicity of liquid volume probe means 16 are angularly disposed around the 60° arc of the table disc 21 at appropriate arc positions providing an automated sequence of a specific chemical analysis procedure. The multiple liquid probe means 16 are positioned as required for a specific analysis procedure, providing chemical solution inputs and outputs for the paired modules 11 and 12 as required. The chemical analysis sample dissolver module 14 is operatively positioned adjacent to the analysis rotary module 13, serially providing on power signal a scheduled solvent volume for each one of the chemical sample reactor modules 11 which is serially positioned below the dissolver module 14 operative position. The tablet disruptor device 15 is driven by a drive means of the dissolver module 14, which provides rotation of the disruptor device 15 in each one of the sample reactor modules 11 on power signal. The disruptor device 15 disintegrates and dissolves the chemical sample in the solvent volume disposed in the reactor module 11. A multiplicity of solution pump means 17 provide, in cooperation with the multiplicity of operative liquid volume probe means 16, for the programmed addition to and subtraction from of precise individual volumes of chemical solution required in each one of the reactor modules 11, tube modules 12 and also in the quantitative analysis instrument 19, on signal.

Procedurally, the modular chemical analyser system 10 provides for the addition of a precise scheduled solvent volume input from dissolver module 14 to the sample reactor module 11 on signal. The chemical sample and the solvent are then agitated together by the tablet disruptor device 15 driven by the sample dissolver module 14, providing a uniform solution in the reactor module after a scheduled rotation period. As the table disc 21 rotates in the equal arc index steps on signal in the chemical analysis rotary module 13 mode of operation, a precise filtered volume of each sample solution is pumped from each reactor module 11 to one container of the paired tube module 12. Further, as the table disc 21 is rotated in equal arc index steps, a precise volume of at least one reagent solution is pumped into each one of the precise volumes of the sample solutions disposed in each one of the tube module 12, utilizing at least one of the liquid volume probe means 16 for dispensing the reagent solution. Mixing, solution heating and the necessary standard chemical analytical procedures can be applied, utilizing one or more of the multiple liquid volume probe means 16 as are required. At the end of the required analytical procedure, as the analysis rotary module 13 moves stepwise in a stop-and-go rotation, a specific readout probe of the probe means 16 removes an aliquot analysis solution sample from the tube module 12, pumping it into an analysis instrument readout cell, utilizing one of the pumps 17. The quantitative analysis measurement is made by a conventional spectrophotometer 19 or the like, and the sample is then vented to a waste container. The quantitative measurement of the instrument 19 is recorded on a strip recorder 20 or the like.

Utilizing a chemical analysis rotary module 13 which can contain 40 pairs of reactor module 11 and tube module 12, automated chemical analysis can be routinely provided. It is basic to the operation of the automated chemical analyser system 10 to provide cooperative pairs of reactor module 11 and tube module 12. The reactor module 11 provides a uniform solution of the chemical sample, without contamination by previous individual chemical samples. The plurality of tube containers of the tube module 12 provides for the plurality of additions of chemical reagent solution, and for the typical manipulations which can be required in a chemical analysis procedure, without contamination from previous chemical analysis steps of other chemical samples. The versatility of the system 10 is amplified by the system's ability to provide solvent volumes utilizing the sample dissolver module 14, and to likewise provide solvent and reagent solutions utilized in the combination of the multiple liquid volume probe means 16 and the multiple chemical solution pump means 17. Thus solutions can be provided as needed in a specific chemical analysis procedure.

A typical chemical analysis procedure utilizing all of the components of the chemical analysis system 10 is described below, and should be read in conjunction with Table I and FIG. 2. Table I briefly describes the operational events and FIG. 2 correlates on a comparative time scale the operational events of the components listed in Table I. Prior to the initiation of the analytical procedure, the operator must position the multiple liquid volume probe means 16 on the elevating means 22, to provide the correct sequence of chemical procedure. Each one of the probe means 16 must be individually adjusted to provide proper probe stops for operation of the probe in the proper reactor module 11 and tube module 12 position. Each one of the probe means 16 must be connected with the appropriate reagent pumps 17, an air supply, and vacuum. The precise volume of each quantity of reagent solution must be selected and set for each one of the pumps. The length of the probe tips of each one of the probe means 16 must be fixed. The composition and volume of the solvent pump addition must be selected. The operation time and speed of the tablet disruptor device 15 must be selected. The wash container of the sample dissolver module 14 must be filled. In addition, the separate quantitative analysis instrument must be calibrated and the timer regulating the flow of the aliquot analysis sample for the analysis instrument must be scheduled. The amount of the chemical sample must be disposed in each of the multiplicity of sample reactor modules 11. The paired tube module 12 must be secured in the support table disc 21 along with the reactor module 11 containing the chemical sample. The first sensor switch activator of the chemical analysis rotary module 13 is indexed over the first sensor switch, initiating the action of the sample dissolver module 14 on activating the reset button for the electronic logic.

On the initiation of the system operating button, the analytical procedure for typically 40 chemical analyses are started and continue sequentially in parallel as the second sensor switch activator advances around the table, turning on the successive probe means 16. The second sensor switch activator turns off the successive probe means 16 as the support table disc 21 rotatively proceeds during the second table revolution.

Figure 2:
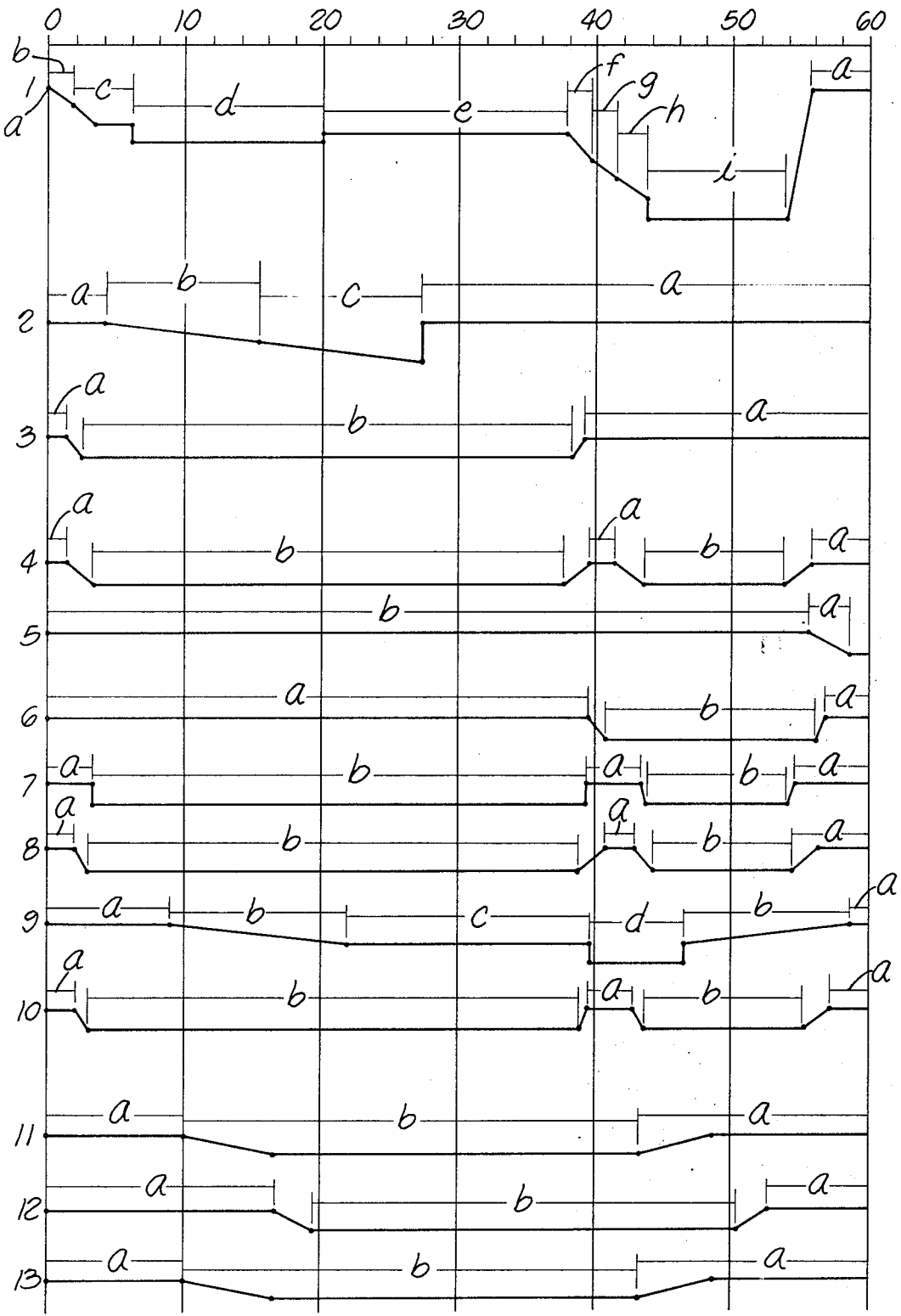
FIG. 2 is a graphical summary of the cooperative timing schedule of the automated chemical analyser system.

The indicia inscribed on each numbered graph of FIG. 2 specifically indicate the operational mode of a system component as indicated in Table I. As the sample dissolver module 14 rotates 90° and moves down into each one of the sample reactor modules 11, a precise volume of solvent is added to each one of the modules 11. The tablet disruptor device 15 is then rotated for a scheduled period of 0 to 120 seconds, disrupting, agitating and dissolving the chemical sample. The dissolver module 14 moves up, rotates 90° to the wash container position, moves down into the wash container and rotates for about 10 seconds, then moves up to the starting position. These events involving the sample dissolver module 14 and the disruptor device 15 are listed in Table I and illustrated graphically as Graph No. 1 of FIG. 2. The scheduled, times coaction of the solvent pump means delivering the precise volume of solvent is illustrated in Graph No. 2-Phase b, and is also listed in Table I.

When the tablet disruptor device 15 is disposed in the reactor module 11, a pressure filter head means aligns with the filter tube of the module 11 and a positive gas pressure is applied to the filter tube to prevent solvent from seeping through the filter mat (Graph No. 3-Phase b). The support table disc 21 rotates one additional equal arc index step and the disruptor device continues the above cycle, disrupting the next sample. The elevator means 14 is depressed (Graph No. 4-Phase b).

TABLE I

I. Sample Dissolver Module
1. Tablet Disruptor Device (14 second rotation time-illustrated)
    a. Standyby—above wash container
    b. Disruptor device rotates to reactor module (R.M.) position
    c. Device moves down into R.M.
    d. Device rotates in R.M.
    e. Device stopped in R.M.
    f. Device elevates up—out of R.M.
    g. Device rotates to above wash container
    h. Device moves down into wash container
    i. Device rotates in wash container.
2. Solvent Pump Means
    a. Standby
    b. Pump discharge into R.M.
    c. Pump refills from solvent reservoir
3. Pressure Filter Head Means
    a. Standby
    b. Pressurizes filter tube of R.M.

II. Chemical Analysis Rotary Module

4. Elevating Means
    a. Pedestal drum elevated
    b. Pedestal drum depressed
5. Support Table Disc
    a. Rotate
    b. Table disc stationary Sample Probe Means 6. Transfer Probe
    a. Extended sampling position
    b. Contracted sampling position
7. Mixing Probe
    a. Off
    b. On
8. Filter Probe
    a. Vacuum off
    b. Vacuum applied to filter tube of R.M.
9. Readout Probe
    a. Line and cell empty
    b. Sample filling flow cell
    c. Sample in flow cell
    d. Spectrophotometer measurement
10. Reagent Addition Probe
    a. Probe tip elevated above reactor and tube module
    b. Probe tip inserted in reactor or tube module III. Liquid Pumps 11. Reagent
    a. Standby—Reset position
    b. Discharge
12. Liquid Valve
    a. Position "a"
    b. Position "b"
13. Pipetter/Diluter
    a. Standby—Discharged position
    b. Pipet As a specific pair of reactor module 11 and tube module 12 serially rotate in the stop-and-go equal arc index steps of the table support disc 21, each one of the multiple probe means 16 have their second sensor switch activated by the second switch activator disposed on the table disc 21.

The analysis rotary module 13 rotates one equal arc index step, and sample dissolver module 14 continues the cycle of Graph No. 1 disrupting the successive chemical sample in the next reactor module 11. Concurrently with the operation of the sample dissolver module 14 as illustrated in Graphs No. 1, 2 and 3, the chemical analysis rotary module 13 is operated as scheduled in Graphs Nos. 4 and 5. Graph No. 4 illustrates that the elevator means is alternately elevated and depressed, initially starting the cycle in the up position, moving down for an extended period during the first major fraction of the cycle, moving up for a short period to be following by a longer down period, and then finally a short fractional up period. Concurrently with the reciprocating motion of the elevator means illustrated in Graph No. 4, the support table disc rotative mode of action is illustrated in Graph No. 5, wherein the table disc 21 is stationary during the major fraction of the cycle time, thus allowing the chemical analysis procedure to function.

The filter probe aligns and seals the filter tube of the reactor module 11 (Graph No. 6-Phase a). A vacuum is applied to the probe tip, drawing about 5 ml. of solution through the filter mat into the filter tube. The elevator means 22 elevates, the table support disc 21 rotates, and the elevator means 22 depresses. As the elevator means 22 depresses, the second sensor switch activator activates a transfer probe and the tip of the transfer probe is inserted into the filter tube. Acting as a pipetter/diluter the transfer probe withdraws an aliquot from the filter tube and withdraws either a rinse or a reagent solution from a storage bottle. The elevator means 22 elevates, and the probe tip of the transfer probe is transferred to one of the containers of the tube module 11. The elevator means 22 depresses and the transfer probe, acting as a pipetter/diluter, ejects the aliquot solution volume plus the reagent or rinse solution volume into the tube module 11 (Graph No. 6-Phase b).

The elevator means 22 elevates, the support table disc 21 rotates another equal arc index step, and the elevator means 22 depresses. Typically in the next stage of the chemical procedure, the second sensor switch activator activates a reagent addition probe, to add a preset quantity of solution to the tube module 11 container, which now contains the aliquot sample volume previously transferred from the reactor module 12. Alternatively, the reagent addition probe can add a predetermined volume of an immiscible solvent, thus preparing the aliquot sample volume for a liquid extraction procedure. In either case the elevator means 22 elevates, the support table disc 21 advances in an equal arc index step, and the elevator means 22 depresses. A mixing probe is now disposed to stir the one or two phases of the solution in the container of the tube module 11 (Graph No. 7-Phase b).

The elevator means 22 moves up, the support table disc 21 advances in another equal arc index step, and the elevator means 22 depresses. The second sensor switch activator activates another transfer probe. The tip of the transfer probe, preset to the desired length, is inserted into the container of the tube module which contains the reacting chemical analysis solution. A precise volume of solution is withdrawn from the container. The withdrawn solution volume can be either the homogenous solution or a precise volume of one of the two phases of the immiscible solutions, as outlined above. The elevator means 22 elevates, the probe tip is transferred to another container of the tube module 11, the elevator means 22 moves down and the transfer probe ejects the solution together with a reagent or rinse solution in a precise volume, as has been pre-scheduled.

In an alternative chemical procedure, the elevator means 22 moves up, the table disc 21 rotates in another equal arc index step, and the elevator means 22 depresses. The second sensor switch activator activates typically a reagent addition probe which adds a pre-selected quantity of a specific solution to the aliquot analysis sample (Graph No. 10-Phase b). The solution is mixed (Graph No. 7-Phase b). In the outlined stop-and-go rotational mode, a specific pair of reactor module 11 and tube module 12 advanced through a chemical analysis procedure which is pre-determined by the specific positioning of the multiplicity of liquid volume probe means 16 disposed above the support table disc 21 in pre-determined arc positions. Thus each pair of modules 11 and 12 are subjected to a fixed analytical procedure as the pair advance around the analysis rotary module 13.

Finally the second sensor switch activator activates the readout probe, the aliquot chemical analysis sample is now picked up by the probe and drawn into the flow cell, typically of a spectrophotometer (Graph No. 9-Phase c). The absorbence of the aliquot solution is read and recorded on a strip recorder (Graph No. 9-Phase d). The sample is then drawn out of the flow cell into a waste container (Graph No. 9-Phase b).

Concurrently, the transfer probe, the filter probe, the readout probe and the reagent addition probe are all conductively connected by tubing to conventional precision micrometer head liquid volume pumps. The pumps can be operated generally in two modes. In one mode, one pump can be set to meter a precise volume of a solution through a specific single probe means 16 on power signal. In the second mode, two pumps also can be connected to withdraw a precise volume of an aliquot solution from one of the modules 11 and 12, and a precise volume of a reagent or rinse solution from a storage bottle, then eject the volumes (Graph 12-Phase b) trough the probe. The relative schedule of operation of the liquid pumps are included in Graphs Nos. 11, 12 and 13, wherein the timing of the reagent pumps are scheduled in Graph No. 11, the valving positions of the pumps are in Graph No. 12, and the coaction of the pumps acting in conjunction with a pipetter/diluter are shown in Graph No. 13.

Except for several potential liquid volume probe means 16 positions required by the operative space for the sample dissolver module 14, the liquid volume probe means 16 can be disposed around the 360° arc perimeter of the chemical analysis rotary module 13, thus providing a wide latitude in the disposition of probe means 16 for a complex chemical analysis procedure. The flexibility of placing the probe means 16 permits direct adaptations of National Formulary and U.S. Pharmacopeia methods of analysis, together with other conventional wet methods of chemical analysis. In view of the simplified method of mounting the liquid volume probe means 16, and the rapidity of changing probes and reagents for an analysis procedure, the chemical analyser system 10 provides a very flexible analysis system. The pair of sample reactor module 11 and analysis tube module 12, together with the other system components, provide an accurate automated chemical analysis means which is free from mass contamination of the system, due to sample carry-over from one specific analysis to another. The application of the pair of modules 11 and 12 provide a system free from chemical contamination in individual automated analysis not hitherto available. The flexibility of the automated chemical analyser system 10 satisfies a need for analyzing a great variety of complex chemical compositions, pharmaceutical and food products. The chemical flexibility and the ease of setting up a complex chemical procedure adapts this invention to a wide range of chemical analysis procedures for a wide variety of consumer products. This invention, taken in conjunction with the earlier cited and referenced patent applications filed this same date, provide a distinctive inventive advance in the art of preparing and analysing chemical sample by automated chemical analysis.

Obviously many modifications and variations in the improvement in the automated chemical analyser system can be made in the light of the above illustrations, embodiment and teaching. It is therefore understood that within the scope of the appended claims the invention may be practiced otherwise than has been specifically described.

We claim:

1. An automated chemical analyser system combination comprising:
 a multiplicity of pairs of a chemical sample reactor module and a chemical analysis tube module radially operatively serially positioned in a support table disc;
 a chemical analysis rotary module providing said support table disc, soid rotary module having a multiplicity of operative liquid volume probe means concentrically disposed on a central reciprocating elevator means;
 a solvent pump means, serially providing a solvent volume from a solvent reservoir to each one of said reactor modules on power signal;
 means cooperating with said reactor modules for automatically agitating said chemical sample and said solvent volume to provide a uniform solution in said reactor module, and
 a plurality of chemical solution pump means cooperating with said multiplicity of operative liquid volume probe means for providing programmed individual volumes of said uniform solutions and individual chemical solutions required in each one of said reactor module, said tube module, and in a quantitative analysis instrument, on signal.

2. An automated chemical analyser system combination comprising:
 a multiplicity of pairs of a chemical sample reactor module and a chemical analysis tube module radially operatively serially positioned in a support table disc;
 a chemical analysis rotary module providing said support table disc, said rotary module having a multiplicity of operative liquid volume probe means concentrically disposed on a central reciprocating elevator means;
 a chemical analysis sample dissolver module operatively positioned adjacent to said analysis rotary module, serially providing on signal a scheduled solvent volume for each one of said chemical sample reactor modules disposed in said support table disc;
 a tablet disruptor device having a drive means of said dissolver module providing rotation of said disruptor device in each one of said sample reactor modules on signal, said device disrupting and dissolving a chemical sample in each one of said solvent volumes; and
 a multiplicity of solution pump means providing, cooperatively with said multiplicity of operative liquid volume probe means, programmed individual volumes of solutions required in each one of said reactor modules, said tube modules, and a quantitative analysis instrument, on signal.

3. A method of automatically conducting a chemical analysis procedure comprising:
 disposing a chemical sample in a single chemical sample reactor module, said sample reactor module radially operatively disposed in a support table disc of a chemical analyser rotary module with a chemical analysis tube module, multiple pairs of said reactor module and said tube module being serially disposed in said table disc;
 providing automatically on power signal a solvent volume for each said chemical sample;
 agitating automatically on power signal each said chemical sample and said solvent volume, providing a uniform solution in said reactor module;
 pumping automatically on power signal a precise volume of each said sample solution from said reactor module to a container of said tube module;
 mixing uniformly automatically on power signal a precise volume of at least one reagent solution with said precise volume of each said sample solution disposed in said tube module, providing a precise chemical analysis reactant solution;
 pumping automatically on power signal each said precise chemical analysis reactant solution into a quantitative analysis instrument, providing an analysis value.

4. In an automated process for preparing a precise solution of an individual solid sample for chemical analysis, the serialized, automated repetitive steps comprising:
 disposing a tablet disruptor device precisely in operative position in an individual chemical reactor sample module containing an analysis sample, said sample module being precisely disposed;
 disposing a positive gas pressure on a filter tube having a filter sheet disposed on the filter tube terminus adjacent said sample;
 dispensing a precise selected solvent volume into said sample module;
 rotating said disruptor device in said solvent volume a scheduled time period, dissolving said sample in said solvent as required;
 stopping said rotating device;
 removing said positive gas pressure from said filter tube;
 disposing said disruptor device in a wash solution;
 rotating said disruptor device in said wash solution for a scheduled time period;
 elevating said tablet disruptor device above said wash solution, preparatory to initiating the identical successive series of steps for a succesive sample;
 evacuating said filter tube, providing a scheduled volume of filtered solution in said filter tube;
 transferring an aliquot filtered solution sample from said reactor sample module to one container of a tube module, cooperatively radially disposed adjacent said reactor module;
 adding a precise volume of at least one reagent solution to said aliquot solution sample;
 mixing said aliquot sample and said reagent solutions;
 providing the required chemical procedural reaction time for said mixed sample and reagent solution;
 pumping the reacted aliquot chemical analysis solution into a quantitative analysis instrument, providing an analysis value;
 venting aforesaid analysis solution subsequent to measuring an analysis value.

References Cited
UNITED STATES PATENTS

| | | | |
|---|---|---|---|
| 3,081,158 | 3/1963 | Winter | 23—259 |
| 3,192,968 | 7/1965 | Baruch et al. | 23—259 X |
| 3,570,555 | 3/1971 | Gilson | 23—259 X |

MORRIS O. WOLK, Primary Examiner

R. E. SERWIN, Assistant Examiner

U.S. Cl. X.R.

23—253 R, 259